United States Patent [19]
Dudar

[11] 3,913,632
[45] Oct. 21, 1975

[54] VEHICLE TIRE INFLATING SYSTEM

[76] Inventor: Walter H. Dudar, 1227 Levee St., Dallas, Tex. 75207

[22] Filed: Mar. 4, 1974

[21] Appl. No.: 447,498

[52] U.S. Cl. .................. 141/95; 141/234; 141/382
[51] Int. Cl.² ............................................ B65B 3/04
[58] Field of Search .......... 141/95, 94, 234, 54, 38, 141/56, 84, 236, 237, 238, 242, 243, 244, 285, 382; 137/557, 558, 559; 222/40, 51; 152/415

[56] References Cited
UNITED STATES PATENTS

| | | |
|---|---|---|
| 2,010,062 | 8/1935 | Dawson .................... 141/95 |
| 2,047,405 | 7/1936 | Byars ....................... 137/559 |
| 3,319,924 | 5/1967 | Wilson ...................... 137/559 |
| 3,517,710 | 6/1970 | Hawkes et al. ........... 141/95 |
| 3,583,415 | 6/1971 | Smith ....................... 141/95 |

Primary Examiner—Houston S. Bell, Jr.
Attorney, Agent, or Firm—John D. Pope, III

[57] ABSTRACT

A tire inflating system for inflating multiple vehicle tires to a predetermined pressure is quickly carried out with means provided for identifying a tire which has an initial pressure below a selected minimum.

3 Claims, 3 Drawing Figures

U.S. Patent   Oct. 21, 1975   3,913,632
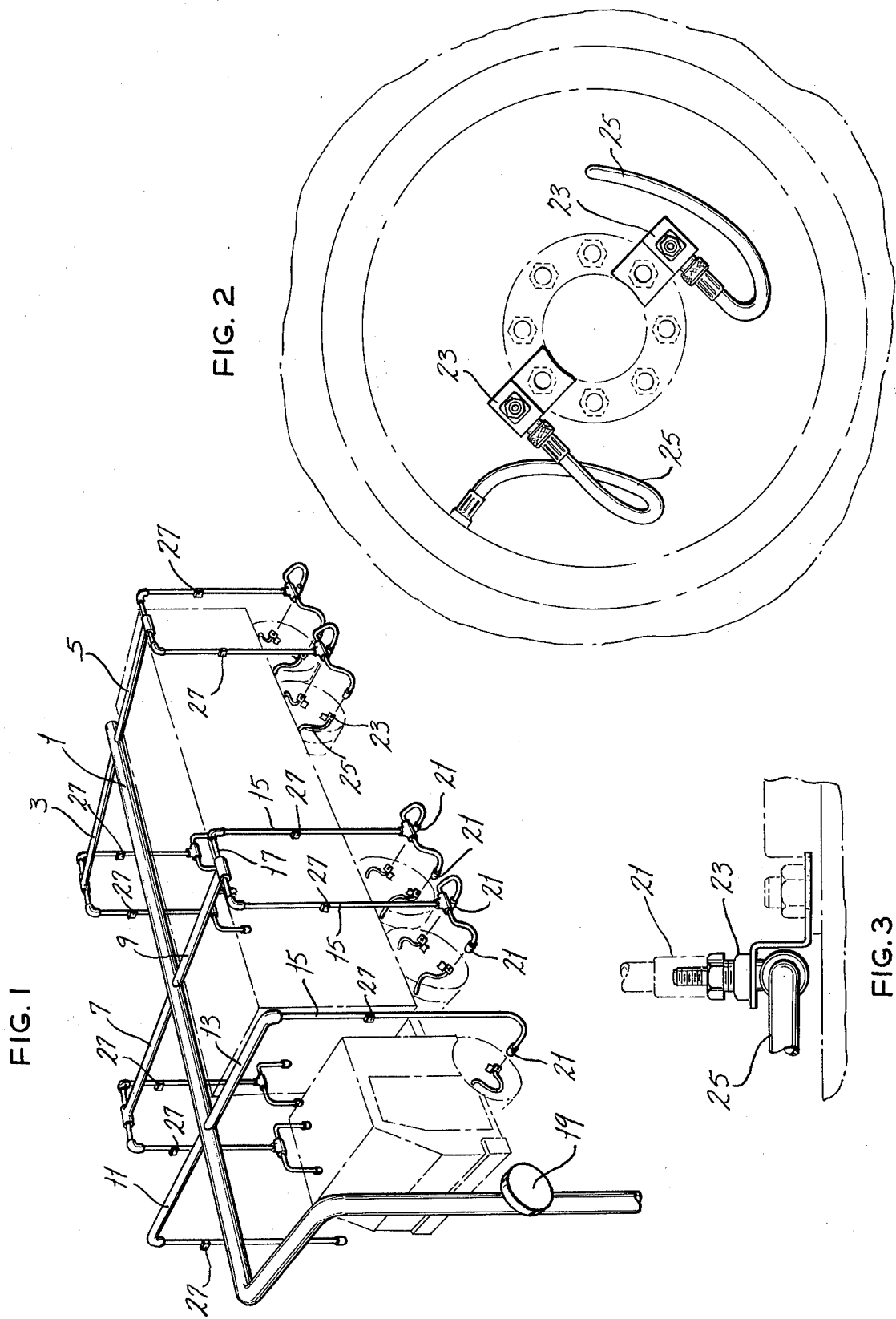

VEHICLE TIRE INFLATING SYSTEM

Vehicle tires have always been an important part of transportation vehicles and this is particularly true with trucks and other vehicles having multiple tires. Although proper pressure is known to be important, the time required often induces a truck driver to sidestep a checking operation which would avoid later labor and equipment costs.

The structure of multi-wheeled vehicles renders manually checking tires correctly before each trip a lengthy and time consuming as well as a troublesome operation. As a result such checking is often neglected with resulting increased time and labor costs, increased damage to equipment, increased and expensive down time on the road and soaring insurance costs.

Among the objects of this invention is the provision of a vehicle tire inflating unit suitable for quickly and reliably inflating vehicle tires to a predetermined pressure; and the provision of such a unit which is inexpensive to construct and which is reliable in use. Other objects and features will be in part apparent and in part pointed out hereinafter.

In accordance with the present invention a tire inflation and checking unit is provided which will inflate all of the tires on a multi-wheeled vehicle in a comparatively short time period, involve only a simple connect and disconnect operation and will identify, if desired, a tire having greatly reduced pressure and therefore one which constitutes a source of incipient trouble. By the use of the tire inflating unit of the present invention time and labor costs are greatly reduced because of the ease of proper tire pressure maintenance.

In the accompanying drawings in which one of various possible embodiments of the invention is illustrated, FIG. 1 is a diagrammatic view showing a tire inflating unit of the present invention, FIG. 2 is an enlarged view of a vehicle wheel adapted for connection of one of the pressure units of the tire inflating unit, and FIG. 3 is an enlarged view showing the inflating unit in place.

Corresponding reference characters indicate corresponding parts throughout the several views of the drawings.

The tire inflating unit of the present invention includes a main supply line 1 connected to a source of compressed air. Branch lines 3, 5, 7, 9, 11 and 13 lead from the main line to a hose 15 attached to each. Lines 3, 5, 7 and 9 have T-shaped branches 17 at their far ends so that two hoses 15 are appended to each. A pressure control valve 19 is located in line 1 for convenient manual adjustment of the air pressure in line 1 and its branches 3, 5, 7, 9, 11 and 13.

Each hose 15 leads to an outlet 21 having an exit port which consists of a quick-connect coupling unit of the usual type such as that shown in U.S. Pat. No. 3,709,528. For most purposes it is preferable to utilize for the hose outlet the female portion of the quick-connect coupling.

The male portion of the coupling, 23, is mounted on the wheel of the vehicle and is connected to the valve stem of the tire by a hose 25. Where double wheels are involved two coupling units 23 are mounted on the outer wheel and a hose runs from each to the valve stem of a tire.

If desired, each line 15 may include a shutoff valve 27 of the usual type adapted to close the line and signal the fact that this has occurred if it is connected to a tire having a pressure below a predetermined amount. A warning device of the type shown in U.S. Pat. No. 3,380,021 is readily adapted to this use.

In use the vehicle is positioned under line 1 with its wheels adjacent hoses 15 and the quick-connect coupling units on the hoses are brought into contact with the coupling units on the wheels, thereby admitting air to the tire to which the coupling unit is connected. The entire operation can be carried out as quickly as the coupling units can be coupled with their mating units. Only approximately one minute is required to couple eighteen such couplers. A five-axle rig can have all of the tires inflated to a desired pressure in less time than is required to fuel a tractor.

As indicated previously, the inclusion of a control on each line can warn of a tire which because of low pressure represents an imminent problem, rather than merely filling it to the predetermined pressure.

In view of the above it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A tire inflating unit for inflating the tires on a multi-wheeled vehicle comprising a supply line for compressed air, a plurality of air passages connected to the supply line, a pressure regulator in the supply line and positioned to regulate the pressure in all said passages to the same predetermined amount, each of said passages terminating in at least one exit port, said passages extending longitudinally and transversely to position said exit ports adjacent to the wheels on a multi-wheeled vehicle when said vehicle is positioned in said unit, each of said exit ports consisting of a quick-connect coupling unit adapted to open to permit passage of air from said supply line to a tire on said vehicle when coupled to a mating coupling connected to the valve of said tire.

2. A tire inflating unit according to claim 1 in which the quick-connect coupling unit at the end of an air passage couples to a mating coupling unit attached to a vehicle wheel, which mating coupling unit is connected by an air passage to the valve of a tire on said wheel.

3. A tire inflating unit according to claim 1 in which the air passages are located above and to the side of a vehicle located in said unit so that the exit ports are located adjacent to wheels of such a vehicle.

* * * * *